(12) United States Patent
Seely et al.

(10) Patent No.: US 8,682,771 B2
(45) Date of Patent: Mar. 25, 2014

(54) COMPUTER-BASED AGGREGATED SECURITIES INVESTMENT SERVICE

(76) Inventors: Jeffrey T. Seely, Bellevue, WA (US);
Jeffrey A. Huse, Seattle, WA (US);
Jeffrey D. Gale, Bellevue, WA (US);
Brian W. Ratzliff, Seattle, WA (US);
Steven K. Abrahams, Seattle, WA (US);
Larry Wickline, Bothell, WA (US);
Paul A. George, Redmond, WA (US)

( * ) Notice: Subject to any disclaimer, the term of this patent is extended or adjusted under 35 U.S.C. 154(b) by 750 days.

(21) Appl. No.: 11/966,712

(22) Filed: Dec. 28, 2007

(65) Prior Publication Data

US 2008/0162375 A1 Jul. 3, 2008

Related U.S. Application Data

(63) Continuation of application No. 09/718,232, filed on Nov. 20, 2000, now abandoned.

(60) Provisional application No. 60/166,388, filed on Nov. 18, 1999.

(51) Int. Cl.
*G06Q 40/00* (2012.01)

(52) U.S. Cl.
USPC ............................................................ 705/36 R

(58) Field of Classification Search
USPC .................................................... 705/35–40
See application file for complete search history.

(56) References Cited

U.S. PATENT DOCUMENTS

| 5,126,936 A | 6/1992 | Champion |
| 5,155,847 A | 10/1992 | Kirouac |
| 5,794,207 A | 8/1998 | Walker |
| 5,918,217 A | 6/1999 | Maggioncalda |
| 5,960,411 A | 9/1999 | Hartman |
| 6,014,642 A | 1/2000 | El-Kadi |
| 6,018,722 A | 1/2000 | Ray |
| 6,021,397 A | 2/2000 | Jones |
| 6,026,441 A | 2/2000 | Ronen |

(Continued)

FOREIGN PATENT DOCUMENTS

| JP | 10-512699 A | 12/1998 |
| JP | 11-250165 A | 9/1999 |

(Continued)

OTHER PUBLICATIONS

Ariba, Inc., "Ariba Acquires TRADEX," PR Newswire, Press Release, Dec. 16, 1999, 6 pages.

(Continued)

*Primary Examiner* — Olabode Akintola
(74) *Attorney, Agent, or Firm* — Christensen O'Connor; Johnson Kindness PLLC

(57) ABSTRACT

A computer-based aggregated security investment service interacts with one or more customers via one or more communication links. The service allows multiple customers to execute aggregated purchase orders of securities in dollar increments. Customers setting up accounts have the ability to select numerous different types of individual, joint, conventional, or tax advantaged accounts. The present invention also provides a mechanism for reducing the exposure of the investment service to purchases of securities with fluctuating prices by staggering share purchases as two or more sub-orders. Finally, the present invention provides a method of producing customized communications for users associated with a non-affiliated organization without requiring separate hardware components for each organization.

20 Claims, 7 Drawing Sheets

(56) References Cited

U.S. PATENT DOCUMENTS

| | | | |
|---|---|---|---|
| 6,029,141 A | 2/2000 | Bezos | |
| 6,108,639 A | 8/2000 | Walker | |
| 6,233,566 B1 | 5/2001 | Levine | |
| 6,421,732 B1 | 7/2002 | Alkhatib | |
| 6,601,044 B1 | 7/2003 | Wallman | |
| 6,615,188 B1 * | 9/2003 | Breen et al. | 705/37 |
| 6,629,135 B1 | 9/2003 | Ross | |
| 6,996,539 B1 | 2/2006 | Wallman | |

FOREIGN PATENT DOCUMENTS

| | | |
|---|---|---|
| WO | 97/22069 A1 | 6/1997 |
| WO | 97/22075 A1 | 6/1997 |
| WO | 97/42591 A2 | 11/1997 |
| WO | 99/14695 A1 | 3/1999 |
| WO | 99/23590 A1 | 5/1999 |
| WO | 99/24891 A1 | 5/1999 |

OTHER PUBLICATIONS

Berners-Lee, T., and R. Fielding, "Hypertext Transfer Protocol—HTTP/1.0," Request for Comments: 1945, May 1996.

Mockapetris, P., "Domain Names—Concepts and Facilities," Request for Comments: 1034, Network Information Center, SRI International, Menlo Park, California, Nov. 1987.

Mockapetris, P., "Domain Names—Implementation and Specification," Request for Comments: 1035, Network Information Center, SRI International, Menlo Park, California, Nov. 1987.

Woods, W. William A., "B2B Exchanges: The Upcoming Convergence of Physical and Financial Markets," Supply Chain Management Review Global Supplement, pp. 20-22, Jul. 2000.

Yahoo.com Web page, May 8, 1999, <http://web.archive.org/web/19990508070818 /http://www3.yahoo.com/> [retrieved Mar. 23, 2005].

95th Congress, 1st Session, "Reports on Banks Securities Activities of the Securities and Exchange Commission Pursuant to Section 11A(e) of The Securities and Exchange Act of 1934 (Public Law 94-29)," U.S. Government Printing Office, D.C., Aug. 1977, pp. 3-101.

Merrill Lynch, Pierce, Fenner & Smith Inc., "Merrill Lynch Announces a Break for the Small Investor," advertisement, 1974, 1 page.

Translation of Office Action dated Mar. 10, 2010, in related Japanese Application No. 2001-539205, filed Nov. 20, 2000 (9 pages).

Japanese Office Action mailed May 26, 2011, issued in Japanese Application No. JP 2001-539205, filed Nov. 20, 2000, 5 pages.

* cited by examiner

COMPUTER-BASED AGGREGATED SECURITIES INVESTMENT SERVICE

CROSS-REFERENCE TO RELATED APPLICATION

This application is a continuation of application Ser. No. 09/718,232, filed Nov. 20, 2000, which claims the benefit of Provisional Application No. 60/166,388, Nov. 18, 1999, which is herein incorporated by reference.

BACKGROUND

For many moderate income investors, the costs associated with investing in individual stocks or other securities are prohibitive given the fact that such securities can generally only be purchased in whole numbers and the fact that a commission must be paid for each purchase. For the investor who wishes to purchase relatively small dollar amounts of securities such as $100-$200 at a time, many securities may be too expensive to even purchase a single unit. In addition, even when using a discount broker, the relative size of the commission versus the amount to be invested can make the transaction unappealing.

As a result, new types of investment plans are being offered that are generally referred to as "dollar-based" investments. With these types of plans, an investor can purchase a specific dollar amount of a security by aggregating their purchase order with other investors who also wish to buy the same security. The money summed in the aggregated order is used to purchase a certain number of securities and the ownership of the securities is then divided in accordance with the percentage of money that each individual investor contributes. In many cases, each investor will be allocated some fractional portion of a security purchased. One example of such a dollar based investment system is disclosed in PCT application No. PCT/US99/05010 by Steven Wallman and assigned to Folio Trade LLC of Great Falls, Va., which is herein incorporated by reference. While the system disclosed in the Wallman PCT application allows users to invest smaller sums of money in individual stocks that are included in a portfolio, the system has not achieved widespread acceptance among consumers. This may be due to the complexity of the system and the overhead required to run it. Therefore, there is a need for a dollar-based investment system that is relatively easy and financially viable to operate both from a customer's and from a broker's perspective. In addition there is a need for an investment system that removes most barriers that typically prevent smaller investors from participating in the stock market.

Another problem faced in the financial community is the ability of smaller financial institutions to retain customers in the face of an ever-increasing array of services offered by larger financial institutions. Many customers desire to maintain a level of service associated with smaller financial institutions but still have access to financial products that may be too expensive for the smaller financial institutions to offer. Therefore, there is a need for a system that can allow financial institutions as well as other types of businesses or organizations to offer more sophisticated services in a cost-effective and in a way that does not seem alien to their loyal customers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aggregated security investment service interfaces with one or more customers via one or more communication links such as the Internet. Customers access the investment service and can set up accounts including numerous types of individual, joint, conventional, or tax advantaged accounts. Customers instruct the investment service to purchase specific dollar amounts of a security at selected intervals. The investment service combines or aggregates orders of all customers wishing to buy the same security, executes the aggregated order and divides the ownership of the securities purchased in accordance with each customer's contribution to the aggregated asset pool.

In accordance with another aspect of the present invention, the investment service can stagger purchase orders into one or more sub-orders to potentially shield itself from price fluctuations between the time a price quote is obtained for a security in order to calculate the number of securities to be purchased and the time a trade is made. The number of securities purchased in each sub-order and the number of sub-orders placed can be varied by the investment service based on statistics of security price or other factors.

In accordance with yet another aspect of the present invention, an investment service allows non-affiliated financial institutions and other organizations to provide dollar-based investing or other financial services to its customers through a communication interface in a manner that maintains the look and feel of the non-affiliated financial institution's existing services. Customers are routed seamlessly through the non-affiliated financial institution's customer interface to the provider of the enhanced services. Additionally, the present invention has the ability to customize all electronic communications from the investment service to the non-affiliated financial institution's customers such that the communications are presented with logos and other characteristic features of the non-affiliated financial institution.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6 and 7 are illustrative Web pages produced by the aggregated securities investment service of the present invention and by a non-affiliated organization.

DETAILED DESCRIPTION

Figure 1:
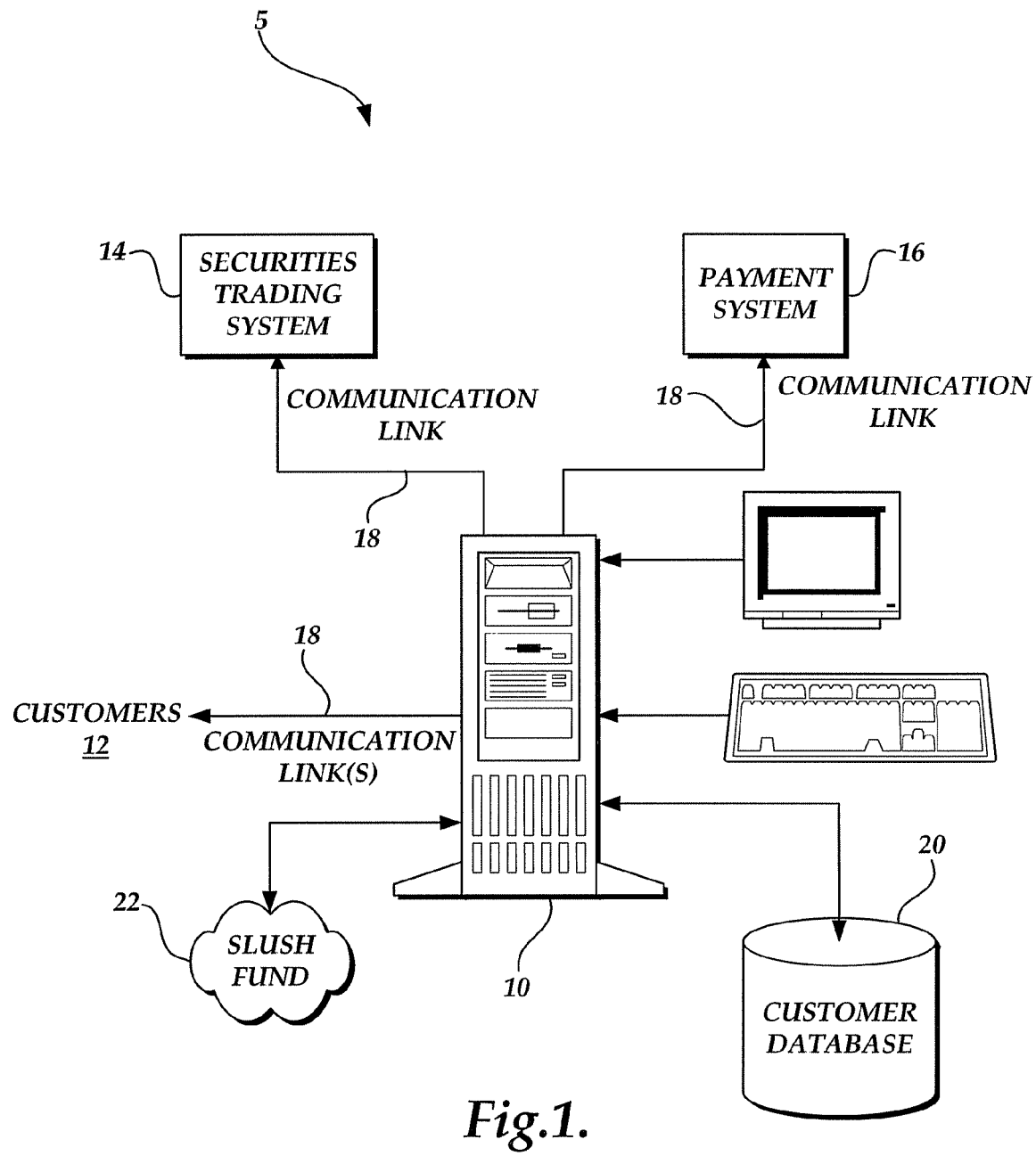
FIG. 1 is a block diagram of a computer-based aggregated securities investment service system according to one embodiment of the present invention.

As shown in FIG. 1, the present invention is a computer-based aggregated securities investment service system 5

(hereinafter referred to as the investment service 5), which allows customers to make dollar based investment purchases. At the heart of the system are one or more computers 10 that communicate with customers 12, a securities trading/security clearinghouse system 14 and a payment system 16 via one or more communication links 18. These communication links 18 may comprise landline or wireless telephone lines, private leased or shared data communication links such as wired or wireless local area networks, wide area networks, the Internet, or a combination thereof. In the presently preferred embodiment of the invention, the one or more computers 10 include one or more Web server computers that communicate with the customers 12 via the Internet.

The customers 12 preferably interact with the one or more computers 10 using personal computers equipped with a Web browser program as is well known in the art of Web programming. However, the customers 12 could also access the one or more computers 10 with other communication devices such as a conventional telephone, cellular telephone, personal digital assistant, Web t.v., 2-way pager, Internet kiosk, or any other mechanism for transmitting information to the one or more computers 10 via a communication link with an appropriate interface.

Figure 2:
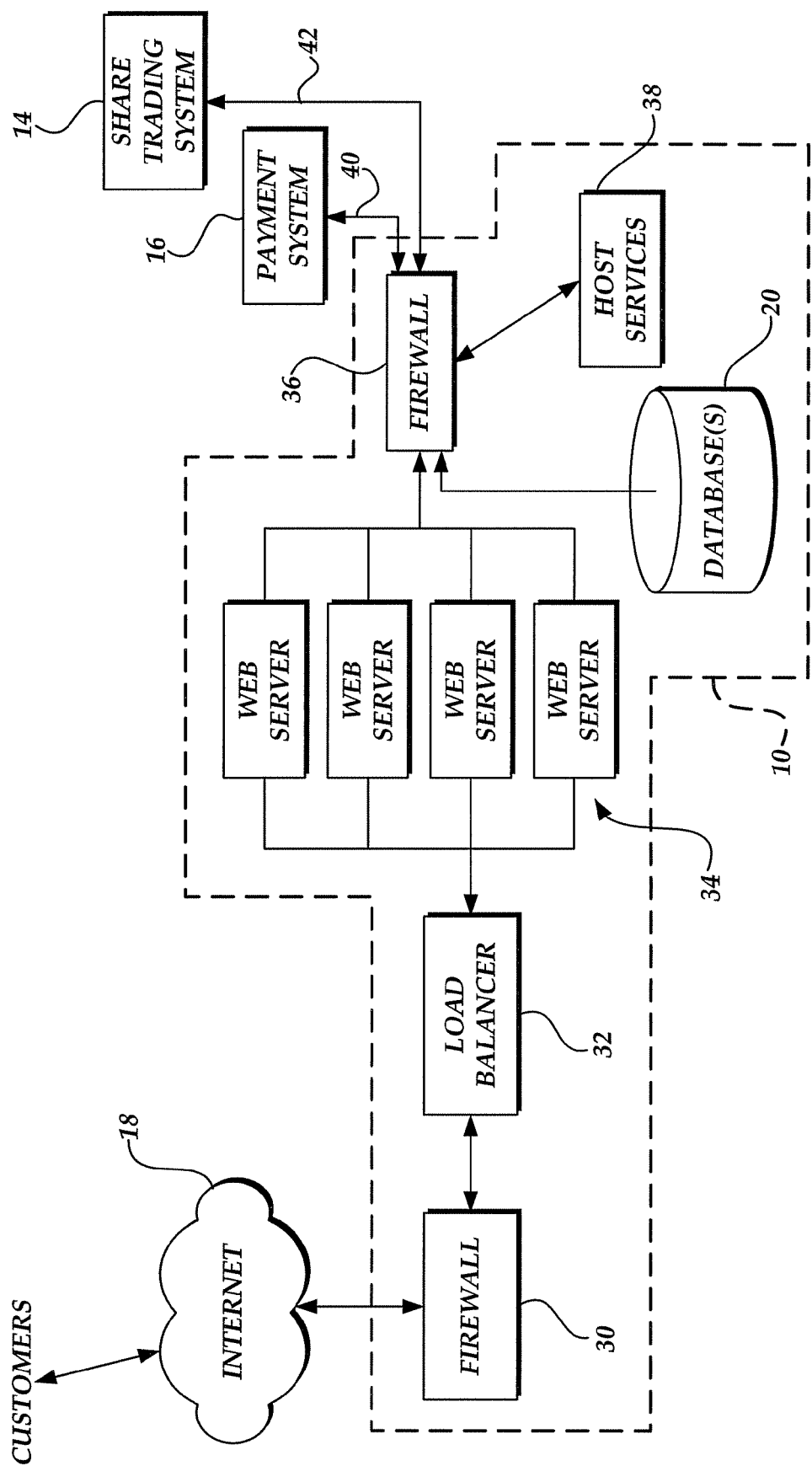
FIG. 2 is a block diagram of a currently preferred arrangement of computers that operate the investment service.

FIG. 2 is a block diagram showing the currently preferred configuration of the one or more computers 10 shown in FIG. 1. The one or more computers 10 include a firewall 30 that serves as a buffer between the Internet 18 and the remainder of the computer system. Coupled to the firewall 30 is a load balancing computer 32 that serves to distribute requests for Web pages to one or more parallely-connected Web server computers 34. Each of the Web servers 34 is further coupled to a second firewall 36 that is positioned between the Web server computers 34 and one or more host services computers 38, one or more databases 20, the securities trading system 14 and the payment system 16. The one or more databases 20 store information regarding customer accounts and transaction ledgers of the investment service 5, etc. The one or more databases 20 communicate with the payment system 16 via a dial-up connection 40. In addition, the one or more databases 20 communicate with the securities trading system 14 via a leased data line 42.

In operation, the one or more Web server computers 34 operate to produce Web pages in response to requests from browser programs associated with the customers. The one or more host services computers 38 perform the functions of arranging for aggregated security purchases and security sales, receiving money from customers and maintaining the books of the investment service.

The investment service 5 operates by allowing multiple customers to setup accounts whereby a specific dollar amount of securities are purchased either on a one time or a periodic basis. At designated intervals, the one or more computers 10 scan the one or more databases 20 for orders of securities to be purchased. The orders of all customers wishing to purchase a particular security are combined and the purchase of the security is made by the one or more computers 10 interacting with the securities trading system 14. The resulting securities purchased are divided among the customers in accordance with each customer's dollar contribution to the aggregated purchase order. In the event that the aggregated order does not contain an amount of money sufficient to purchase a whole number of shares, the one or more computers 10 access a "slush fund" or maintenance account 22. The account 22 is maintained by the investment service in order to round up the number of securities to be purchased to a whole number and to supply additional funds required to buy securities as will be explained below. The fractional security purchased by the investment service 5 as a result of rounding up is held in the slush fund 22 for use by the investment service, to keep or sell as necessary.

The one or more computers 10 perform three major functions. These include (1) interfacing with customers to set up and modify accounts, transmit account statements and confirmations, allow retrieval of historical transaction data and so forth., (2) running a brokerage accounting system (BAS) to reconcile account balances and handle aggregate buy orders and sell orders and (3) interfacing with a securities trading/ securities clearinghouse 14 to execute aggregated purchase orders or sell orders and the payment system 16 to receive money from the customers.

Figure 3:
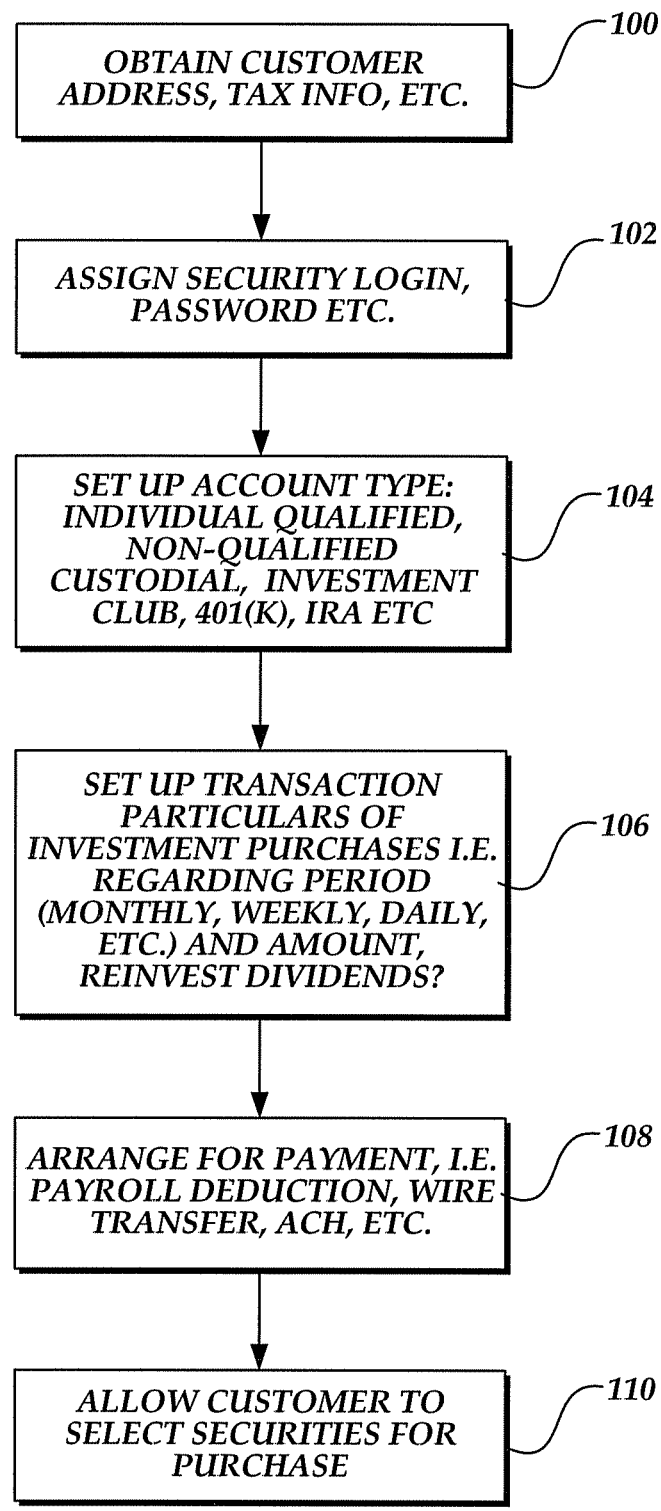
FIG. 3 is a flowchart of a series of steps performed by one or more computers of the investment service to setup a client account.

As part of the customer setup process, the one or more computers 10 perform some or all of the steps illustrated in FIG. 3. It will be appreciated that these steps need not be performed in the order described and furthermore that fewer or additional steps may be performed in order to setup a customer account. At step 100, the one or more computers interact with the customer, preferably using one or more Web pages, to allow the customer to provide the customer's name, address, tax identifier and any other personal information required to set up a securities trading account. At a step 102, one or more computers 10 interact with the customer to allow the customer to select a secure method of accessing the investment service including for example a login name, password, etc., in order to prevent fraudulent use of the system. At a step 103, the customer interacts with the one or more computers 10 to select the type of account to be created. This can include individual accounts, qualified plans, nonqualified plans, custodial accounts, investment clubs, 401K plans, IRAs, etc. Selecting the account type in this manner enables the system to automatically assign varying commission levels and to track and report specific data appropriate to such types of accounts, as well as to appropriately restrict access to funds and securities in the case of an account held by more than one person.

At a step 106, the customer interacts with the one or more computers 10 to provide information concerning the transaction particulars of the investment purchases they would like to make, i.e., the period at which they would like to make purchases, such as monthly, weekly, daily, or on a one time basis, an amount they would like to spend either per security or per purchase (presently $1 minimum, no maximum) and whether any dividends received from the securities they purchase are to be reinvested.

At a step 108, the customer interacts with the one or more computers 10 to provide information concerning the method of payment to the investment service 5 including payroll deduction, wire transfer, ACH (electronic funds transfer), etc.

At a step 110, the customer interacts with one or more computers 10 to select the particular one or more securities they would wish to purchase for each transaction. For example, a customer may select to purchase $100 of Microsoft stock and $25 of Xerox stock on the $1^{st}$ and $3^{rd}$ Tuesday of each month. Securities need not be limited to stocks but may also include bonds, annuities, futures, options, gold, commodities or any other item that is bought and sold on an exchange or other market with which the one or more computers 10 can communicate. The particular securities to be purchased may be modified by the customer at any time, and investor's recurring investment plans can be suspended and restarted at any time.

Figure 4:
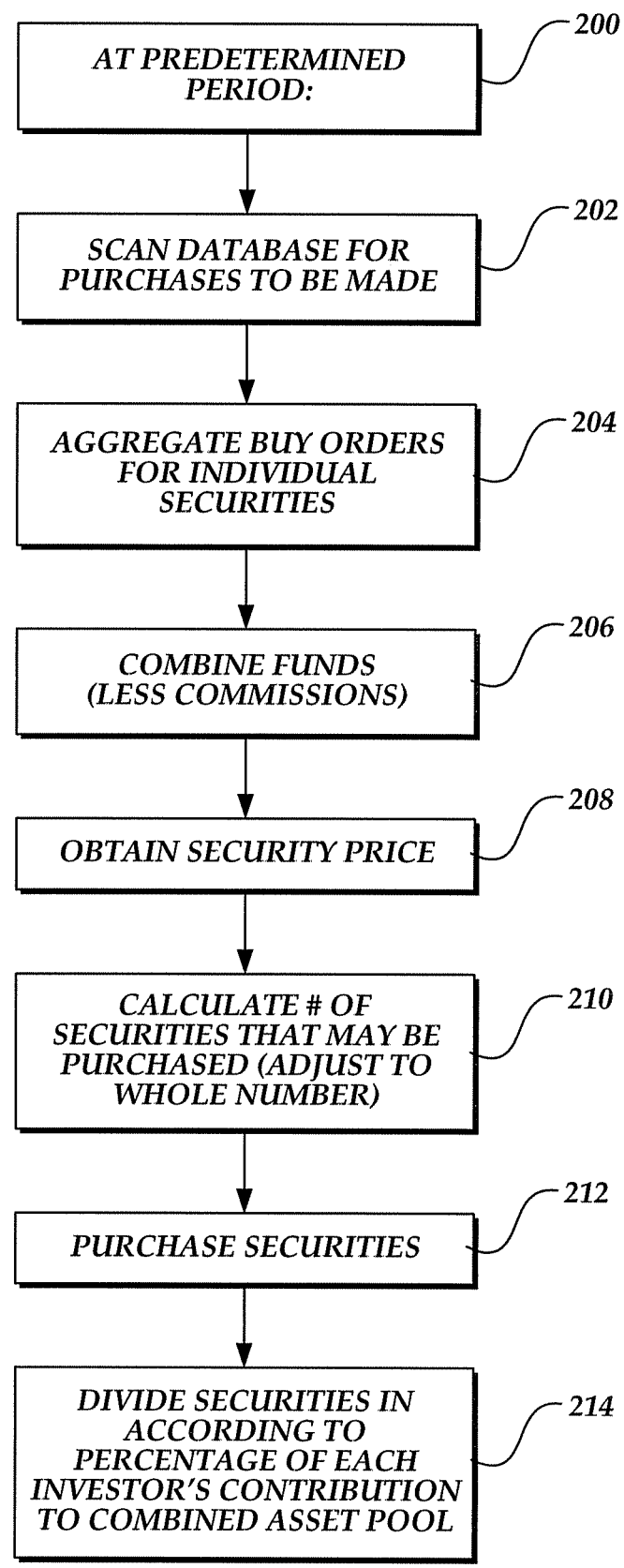
FIG. 4 is a flowchart of a series of steps performed by one or more computers of the investment service to execute an aggregated securities purchase.

FIG. 4 illustrates steps performed by the one or more computers 10 in order to execute an aggregated security purchase. Beginning with a step 200, at a predetermined interval, such as once a week, once a day, twice a day, twice an hour, etc., the one or more computers scan the database 20 for purchases of a particular security to be made. For example, assume two customers wish to make stock purchases on the fifth day of each month. Investor A wishes to purchase $100 of Microsoft stock and $50 of Xerox stock and Customer B wishes to purchase $50 of Microsoft stock and $100 of IBM stock. Sometime prior to the requested purchase date, the one or more computers will scan the database 20 and see that a combined total of $150 of Microsoft stock is to be purchased on the 5th day of the month. At a step 204, the one or more computers aggregate purchases for individual securities and at a step 206 combine the total dollar amounts of a security to be purchased by the investors (less commissions). In the present embodiment of the invention, the commission charged for each purchase varies by the type of account. For example, individual or joint accounts may be charged a $2 commission per purchase, while custodial or retirement accounts may be charged a $1 fee per purchase. The system also identifies participants in special promotions for whom a smaller fee or no fee is charged for a designated period of time or number of transactions.

At a step 208, the one or more computers 10 communicate with the securities trading system 14 (FIG. 1) or other quote providing system that can provide a current trading price of the securities to be purchased. At a step 210, the one or more computers calculate the number of securities that may be purchased with the combined order and adjusts the number of securities to be purchased to some whole number by either rounding up, as in the currently preferred embodiment, rounding down or some other means for adjusting the number of securities.

At a step 212, the one or more computers interact with a securities trading system/securities clearinghouse 14 to purchase the number of securities determined at step 210 at the current market price. At a step 214, the one or more computers divide the securities among the investors in accordance with the percentage of each investor's contribution to the combined asset pool. As indicated above, in many instances an individual shareholder will receive a fractional amount of a particular security. In addition, if the investment service 5 was required to add money to the asset pool in order to round up a purchase of securities to a whole number of shares, etc., any fractional security purchased with the money provided by the investment service 5 will be maintained in the slush fund 22 as shown in FIG. 1.

In many instances, the price of the security that was obtained at step 208 may have changed by the time the actual purchase is made. If the price of the security goes down, then the asset pool will have too much money in it to buy the number of securities requested. The present embodiment of the invention handles the excess funds by returning the excess funds to each investor's account in accordance with their relative contribution to the asset pool. If the price of the security rises, the aggregated asset pool will not contain enough money to purchase the number of securities requested and the brokerage system will supply the additional funds required and receive a commensurate percentage of the securities purchased.

As may be appreciated, the requirement that the brokerage contribute its own funds to purchase a specified number of shares can add significantly to the capital required to run the service.

For example, assume that 100 customers place an order to buy $100 worth of ABC Corporation stock. If each customer is charged a $5 commission, that leaves $9500 left to buy the stock. If the investment service checks the share price and it's $10 a share, an order is created to buy 950 shares of ABC Corporation. If, between the time the order is created and the time it is executed, the price of the stock jumps to $12 a share, then $11,400 is required to complete the order—$1900 of which is contributed by the investment service 5. Now the investment service owns $1900/12 or 158.33 shares of ABC Corporation in its slush fund that it didn't want to buy.

As a way to potentially reduce the amount of funds required of the investment service to complete an order for securities that have risen in price, the investment services may elect to stagger an order in several stages. For example, if the order is for 950 shares, an initial, partial order may be placed for some variable percentage, (e.g. 80 percent) of the total order (80% of 950=760 shares). Next, a subsequent order can be placed for a variable portion, (e.g. 80 percent) of the remainder, and so forth, until the entire order is completed.

In the example discussed above, if, between the time an order for 950 shares of ABC Corporation is created assuming a $10 share price, the price jumps to $12 a share; the brokerage would typically have to contribute $1900 to fill the order.

If the order is staggered such that when a first portion of the order is filled, (e.g., 80 percent=760 shares in this example) the shares jump to from $10 to $12, then $9120 of the $9500 investment pool has been used (i.e., $380 remaining).

The one or more computers 10 can then re-determine how many securities the balance of the aggregated investment pool will purchase. To do this, the one or more computers 10 obtain another quote of the security in question and a new order is generated. Continuing with the example, if after the first portion of the original order has been placed, the shares of ABC corporation remain at $12 a share, then it is estimated that the remaining $380 will purchase 31.66 shares (rounded up by the investment system to 32 shares). A new order is then placed for some variable percentage of 32 shares. For example, 80% of 32 shares is 26 shares (rounded up). The process continues until all the funds in the aggregated asset pool have been used to buy securities.

As will be appreciated, the investment service 5 can alter the percentage of each order that is placed at any time. In addition, the investment service 5 can alter the number of iterations that are used to spend all the money in the aggregated asset pool. For example, for lightly traded stocks, the investment service 5 might execute 100% of an order on the first iteration. However, for heavily traded securities, the investment service 5 might execute 80% of an order on the first iteration, 80% of the remainder on the second iteration, and 100% of the following remainder on the third iteration. The particular strategy employed will likely depend on the trading volume of the security and on its price history.

By dividing or staggering an order into several "sub-orders," the investment service may be able to reduce its exposure to securities that are rapidly fluctuating in price. The percentage of an order that is placed at any time can be changed by the operators of the one or more computers 10 based on statistics of the security price or other factors.

If an order is completed in a number of staggered sub-orders, then a weighted share price is preferably used to determine how the shares purchased will be divided.

When a customer wishes to sell a security, they interact with the one or more computers 10 to place a sell order. The present embodiment of the invention operates to place a sell order in real time by interacting with the securities trading system/security clearinghouse 14 to complete the trade. Presently, the investment service 5 charges a customer a higher commission, e.g., $19.95 per trade, to sell securities because sell orders are not aggregated with other customers wishing to sell the same security. The reason for this aspect of the present embodiment of the investment system is that investors may be more interested in immediate liquidity—i.e., the ability to sell securities in a real time transaction in order to respond to current market conditions, as opposed to waiting some period of time until the next aggregated trade order. If the customer wishes to sell a fractional part of a security, the brokerage pays the market rate for the security and adds the fractional share purchased to the slush fund 22.

As indicated above, the one or more computers 10 also perform several other functions in addition to creating customer accounts and buying and selling securities. The one or more computers 10 also store the results of the purchases or sales in the one or more databases 20 for delivery to a presentation layer that creates statements for viewing by a customer so that the customer can see their account balances and securities positions, review historical transaction data, perform research and so forth.

The one or more computers 10 also perform certain housekeeping functions such as validating information including checking the database (e.g., in the case of making a stock trade, the one or more computers would check the database to see if the user had funds available). If the information is validated and returns errors, then the one or more computers tell the presentation layer to display an error message.

The one or more computers 10 also maintain a brokerage accounting system (BAS). In one actual embodiment of the invention, the BAS is a relational database that is part of the one or more databases 20 and serves as a complete set of books and records for the investment service and for the transaction engine for the system. The investment staff can access the BAS directly through computers located at the investment service and may perform different operations within the BAS, i.e., maintenance, problem resolution, brokerage checks, etc. In addition, the system accesses data from the BAS directly and delivers the data through the presentation layer.

As indicated above, an additional problem faced by smaller providers of financial services or other organizations such as colleges, clubs, unions etc., is how to attract and retain customers or members without investing the capital in setting up systems that provide sophisticated financial products such as the dollar based security investment service described above. Many customers have loyalties to their own local financial or other organizations but become uncomfortable when their organization provides them with a service that does not operate in the same way or have the same "look and feel" as the remainder of the services that they offer.

The present invention provides a solution for smaller financial institutions and others by letting them partner with a provider of the aggregated securities investment service of the present invention in order to offer additional services in a manner that maintains the look and feel of their existing services.

Figure 5:
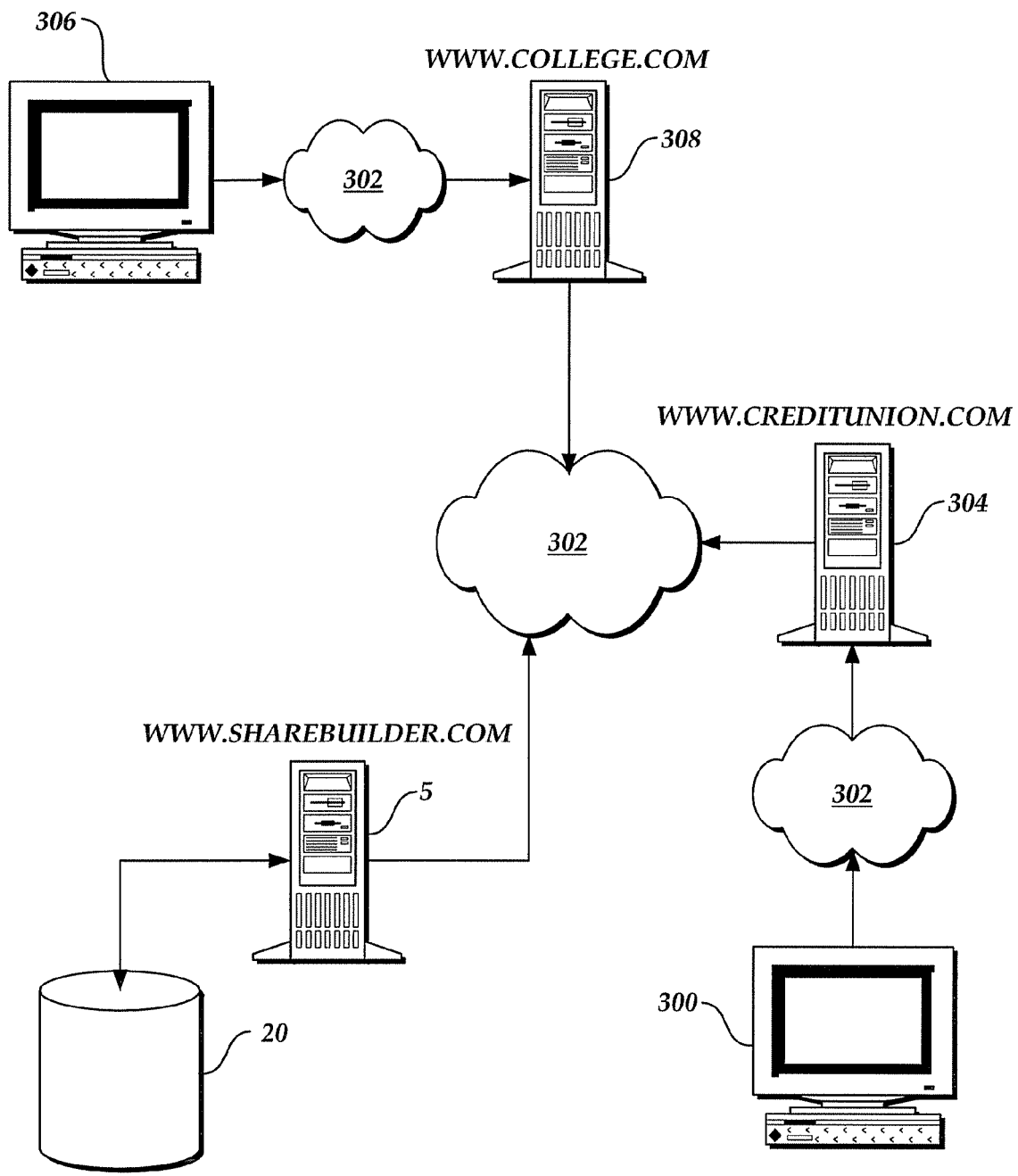
FIG. 5 illustrates a computer-networked environment whereby organizations are partnered with the aggregated securities investment service of the present invention.

FIG. 5 illustrates an interconnected communication environment whereby a customer 300 can be connected to a server computer 304 of a local credit union by a communication link 302 such as the Internet. Similarly, a second user 306 can be connected by the communication link 302 to a server computer 308 of a college. As will be explained in further detail below, the present invention allows each of these partnered organizations to provide the aggregated security brokering service of the present invention in a manner that does not differ substantially from the look and feel of their currently existing interface produced by the Web servers 304 and 308. In addition, the partnering organizations can offer the investment service without becoming a licensed brokerage-dealer themselves. In practice, when each of the users 300, 306 accesses the investment service 5 through the respective servers 304 and 308, they are routed via the communication link 302 to the investment service 5 through the communication link 302 in a manner that is virtually seamless to the customers. The security investment service 5 stores information regarding the customers 300, 306 on its one or more databases 20 in a manner that differentiates them from other customers who access the aggregated security investment service directly.

Figure 6:
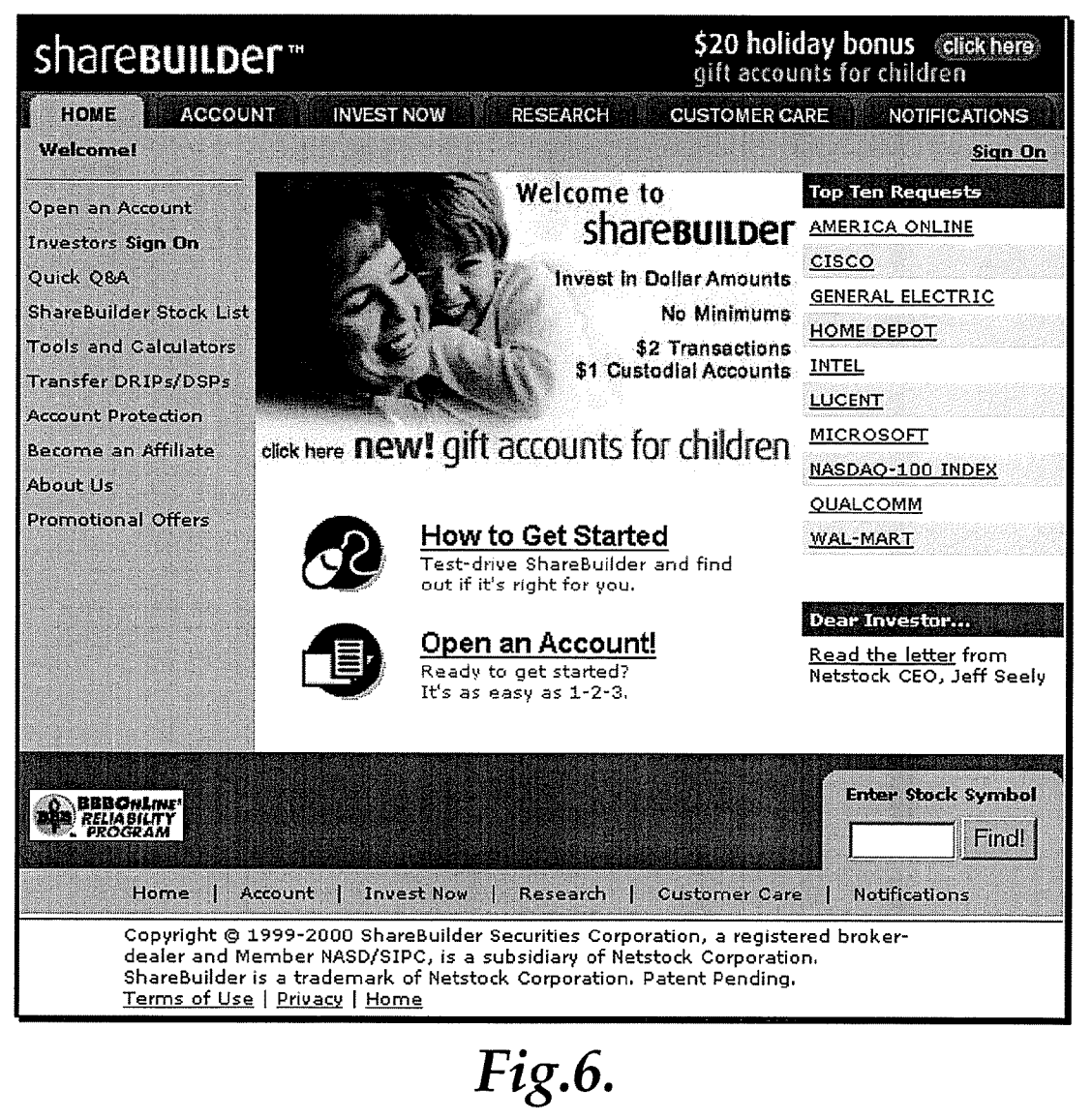

FIG. 6 is a screen shot of a Web page produced by the aggregated security investment service 5 of the present invention. At the present time, this Web page can be found at www.sharebuilder.com, which is produced by Netstock Corporation of Bellevue, Wash., the assignee of the present invention. In the Web page are numerous controls or links that can be selected by a user with their Web browser to set up accounts, make trades, obtain account information, obtain investment data, etc.

Figure 7:
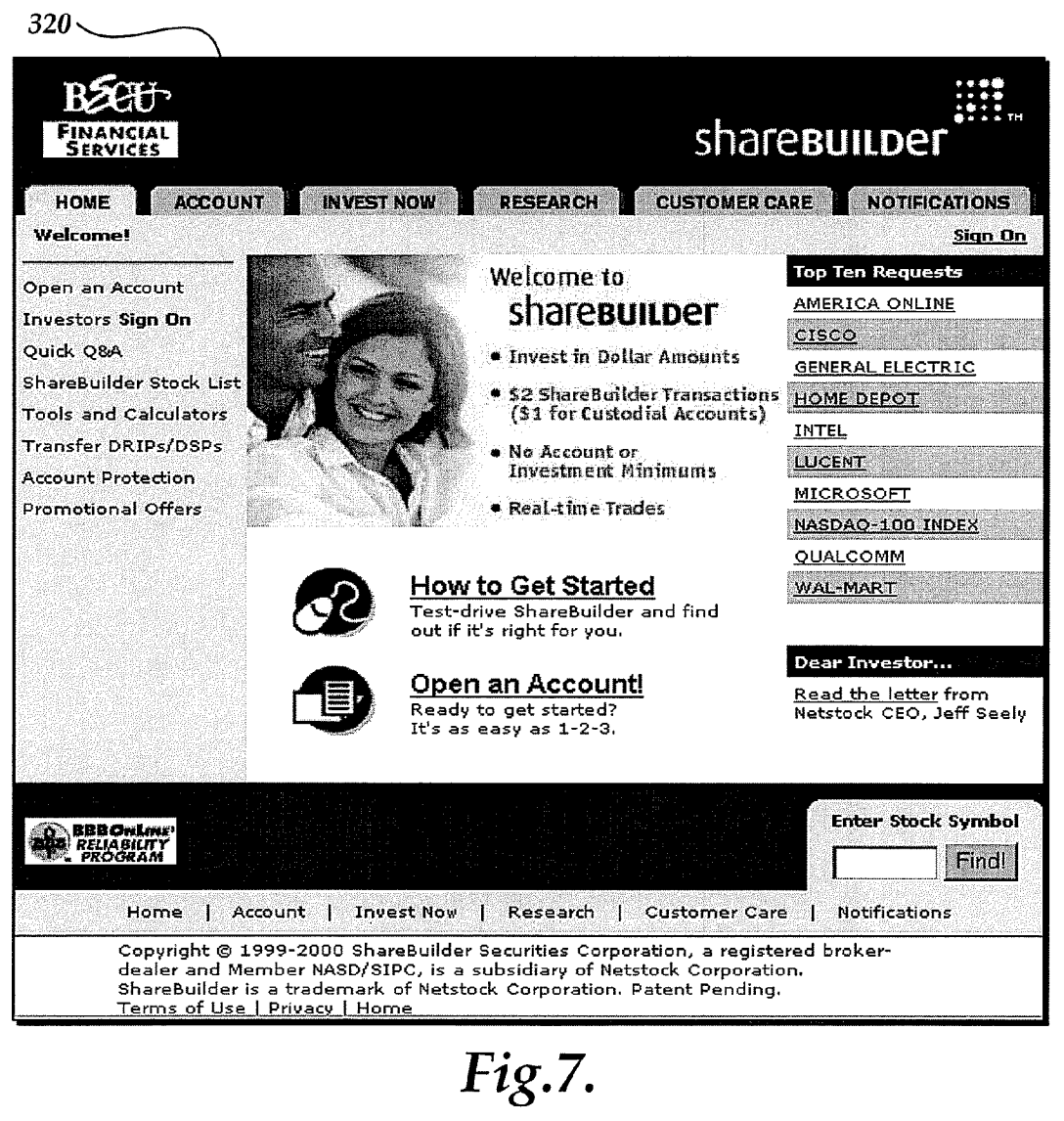

FIG. 7 shows a Web page created for a non-affiliated financial organization. In particular, the Web page shown in FIG. 6 is produced by the Boeing Employee's Credit Union$^{SM}$ which is partnered with Netstock Corporation to provide the aggregated securities investment service as discussed above. As can be seen by comparing the FIGS. 6 and 7, many of the controls and links found on the Web page are the same. However, the Web page shown in FIG. 7 can include a banner 320, trademark or other logo that is specific to the particular partner. In addition, the Web page may be colored or otherwise arranged to closely match other Web pages produced by the non-affiliated partnered organization.

In order to provide additional services displaying a look and feel similar to those of a non-affiliated organization, the investment service 5 may produce Web pages that contain the logos of the non-affiliated financial organization, are designed using the same colors, are laid out in a similar manner as the other user interfaces of the non-affiliated organization, and contain controls or links that are related to the non-affiliated organization.

A customer accesses the investment service 5 either by typing in or selecting a URL of the form www.shareholder.com to access the investment service 5 directly or by typing or selecting a URL of the type partner1.sharebuilder.com, partner2.sharebuilder.com, . . . partnerN.sharebuilder.com, where each of the prefixes "partner1-partnerN" refer to non-affiliated, partnered organizations that support the aggregated investment service of the present invention. If each of the URLs by which a customer can access the investment service has its own IP address, then the investment service must provide hardware support for each of the IP addresses. In a case where the investment service 5 supports hundreds or even thousands of non-affiliated organizations, the infrastructure required to support each IP address could become cost-prohibitive. On the other hand, if each of the related URLs is mapped to the same IP address, conventional Web applications cannot determine the source or portal used by a customer to access the investment service 5. Therefore, conventional Web applications can only produce the same Web pages without customizing them for the non-affiliated organization through which the customer accesses the investment service.

To solve this problem, the one or more computers 10 used in the investment service 5 are programmed to read the HTTP (hyper-text transfer protocol) request header to determine the Web site of the non-affiliated, partnered organization through which the user/customer has accessed the investment service 5.

Web application software running on the one or more computers 10 then responds by streaming HTML back to the customer that is configured according to parameters that are stored in a database that relate how Web pages should be customized for the particular non-affiliated organization. In this manner, the Web application builds Web pages that can be easily customized for particular non-affiliated organizations using a single hardware system. To build the Web pages, a template of the page is produced and customized in accordance with customizing instructions stored in the database that are particular for the referring non-affiliated organization. The customization is not limited to the Web pages produced for the non-affiliated partnered organization. The one or more computers scan the databases 20 for an indication of the organization with which the customer is associated. The one or more computers can then customize all communication with the customer such as account statements, notices, promotional material etc., in a manner that is consistent with the look and feel of the associated organization. In addition the one or more computers can customize the Web pages produced for a partnered organization to selectively add or delete features requested by the organization. For example, some partnered organizations may have their own real-time stock trading system. Therefore, any Web pages produced by the one or more computers 10 would eliminate any links to a real-time trading service offered by the investment service 5.

The customization preferably takes place each time the customer accesses the investment service. For example, if a customer accesses the investment service through their bank that does not want the customer to see a competing real-time stock purchase service, then the Web pages produced will not include a link to such a service. However, it the same customer accesses the investment service 5 directly without linking from the Web site of such bank, then they would be shown a Web page that might include such a link. However, it would be appreciated that is also possible to store a code in a customer's record such that regardless of how that customer then accesses the investment service, they are always presented with the Web pages associated with a partnered organization.

In addition, when a customer accesses the investment service 5 for the first time, a record is stored in the database that indicates the identity of the non-affiliated organization by which they accessed the investment service 5 in order to pay a commission or other incentive to the non-affiliated organization. Such an incentive may be paid on a one-time basis or with each trade made by the customer. If such incentive is to be paid each time a trade is made in the subject account, the system will perform this function no matter how the customer accesses the account.

While the preferred embodiment of the invention has been illustrated and described, it will be appreciated that various changes can be made therein without departing from the scope of the invention. For example, the ability to create custom Web pages for non-affiliated organizations is not limited to computer system that provides financial services. The technique can be used in any Web-based system. For example, an auto manufacturer could have a computer system that produces Web pages illustrating its new cars wherein the Web pages are customized for each of its dealers. It is therefore intended that the scope of the invention be determined from the following claims and equivalents thereto.

The embodiments of the invention in which an exclusive property or privilege is claimed are defined as follows:

1. A method of operating a computer to execute a securities order, the method comprising:
   determining, with the computer, an asset pool of money available to purchase a dollar amount of a security;
   determining, with the computer, a first current market price of the security;
   determining, with the computer, a first number of units of the security that can be purchased based on the size of the asset pool and the first current market price to fully invest the asset pool in the security;
   determining, with the computer, a second number of units of the security that is greater than zero and less than the first number of units, wherein the second number of units of the security does not fully invest the asset pool in the security;
   generating, with the computer, a first order to purchase the second number of units of the security;
   determining, with the computer, a second current market price of the security subsequent to when the first current market price was determined; and
   generating, with the computer, at least a second order for the security, wherein the second order is for purchasing an additional number of units of the security that is based on the second current market price of the security and the size of the asset pool of money that remains after execution of the first order.

2. The method of claim 1, further comprising:
   using the computer to generate a number of additional orders for units of the security until all the money in the asset pool has been fully invested in the security.

3. The method of claim 2, wherein the number of additional orders that are generated depends on a volume of trading in the security.

4. The method of claim 1, wherein at least one additional order for the security is generated for a number of units of the security that is less than the number of units required to fully invest the remaining asset pool in the security.

5. The method of claim 1, wherein the second number of units of the security is a percentage of the first number of units that is less than 100 percent of the first number of units.

6. The method of claim 5, wherein the percentage is fixed.

7. The method of claim 5, wherein the percentage varies according to a volume of trading in the security.

8. A system for allowing users to purchase dollar-based amounts of securities over a computer network, the system comprising:
   one or more computers accessible by users over the computer network that are programmed to allow the users to set up accounts, request periodic purchases of securities in specific dollar amounts and provide statements to the users of their account positions; and
   one or more databases that store information about the users including dates on which securities are to be purchased, the one or more computers being programmed to use the information in the one or more databases and create an aggregated order for a security with a combined asset pool with money from each user wishing to buy the security, the one or more computers being configured to:
   determine the combined asset pool of money available to purchase a security;
   determine a first current market price of the security;
   determine a first number of units of the security that can be purchased based on the size of the asset pool and the first current market price to fully invest the asset pool in the security;
   determine a second number of units of the security that is greater than zero and less than the first number of units, wherein the second number of units of the security does not fully invest the asset pool in the security;
   generate a first order to purchase the second number of units of the security;

determine a second current market price of the security subsequent to when the first current market price was determined; and generate at least a second order for the security, wherein the second order is for purchasing an additional number of units of the security that is based on the second current market price of the security and the size of the asset pool of money that remains after execution of the first order.

9. The system of claim 8, wherein the one or more computers are further configured to generate at least one additional order for the security for a number of units of the security that is less than the number of units required to fully invest the remaining asset pool in the security.

10. The system of claim 8, wherein the second number of units of the security is a percentage of the first number of units that is less than 100 percent of the first number of units.

11. The system of claim 10, wherein the percentage is fixed.

12. The system of claim 10, wherein the percentage varies according to a volume of trading in the security.

13. The system of claim 8, wherein the one or more computers are further configured to generate a number of additional orders for units of the security until all the money in the asset pool has been fully invested in the security.

14. The system of claim 13, wherein the number of additional orders that are generated depends on a volume of trading in the security.

15. A computer-implemented method of executing securities orders, the method comprising:
under control of one or more computing devices:
determining an asset pool of money available for purchasing a security;
determining a first current price of the security;
determining a first number of units of the security that can be purchased based on the size of the asset pool and the first current price of the security, wherein the first number of units would fully invest the asset pool in the security;
determining a second number of units of the security that is greater than zero and less than the first number of units, wherein the second number of units of the security does not fully invest the asset pool in the security;
generating a first order to purchase the second number of units of the security;
determining a second current price of the security subsequent to when the first current price was determined; and
generating at least a second order to purchase an additional number of units of the security that is based on the second current price and the size of the asset pool that remains after execution of the first order.

16. The computer-implemented method of claim 15, wherein the second number of units of the security is a ratio of the first number of units, and the ratio is less than one.

17. The computer-implemented method of claim 16, wherein the ratio is determined according to a volume of trading in the security.

18. A non-transitory computer-readable storage medium having computer-executable instructions stored thereon for executing securities orders, wherein the instructions, in response to execution by one or more computing devices, cause the one or more computing devices to:
determine an asset pool of money available for purchasing a security;
determine a first current price of the security;
determine a first number of units of the security that can be purchased based on the size of the asset pool and the first current price of the security, wherein the first number of units would fully invest the asset pool in the security;
determine a second number of units of the security that is greater than zero and less than the first number of units, wherein the second number of units of the security does not fully invest the asset pool in the security;
generate a first order to purchase the second number of units of the security;
determine a second current price of the security subsequent to when the first current price was determined; and
generate at least a second order to purchase an additional number of units of the security that is based on the second current price and the size of the asset pool that remains after execution of the first order.

19. The non-transitory computer-readable storage medium of claim 18, wherein the second number of units of the security is a ratio of the first number of units, and the ratio is less than one.

20. The non-transitory computer-readable storage medium of claim 19, wherein the ratio is determined according to a volume of trading in the security.

* * * * *